UNITED STATES PATENT OFFICE.

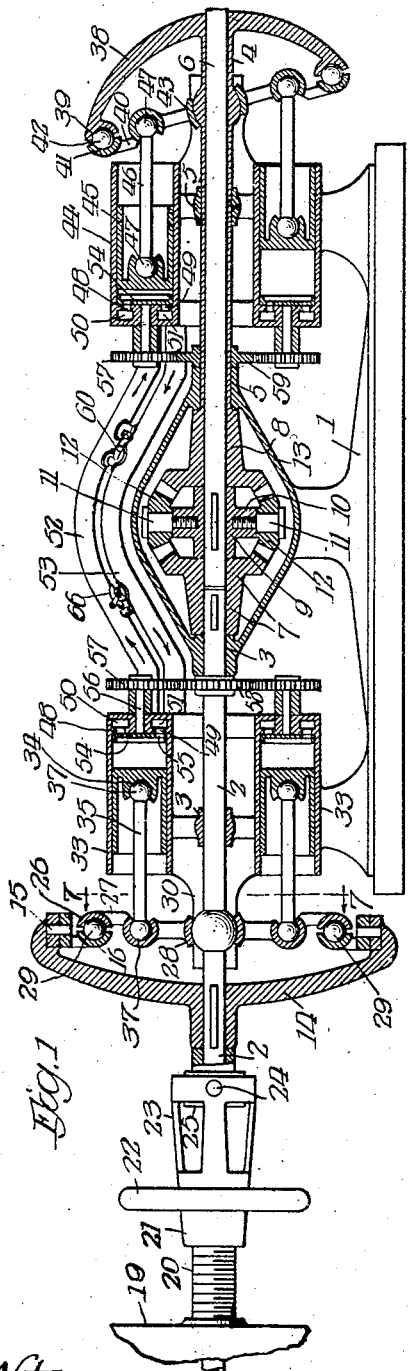

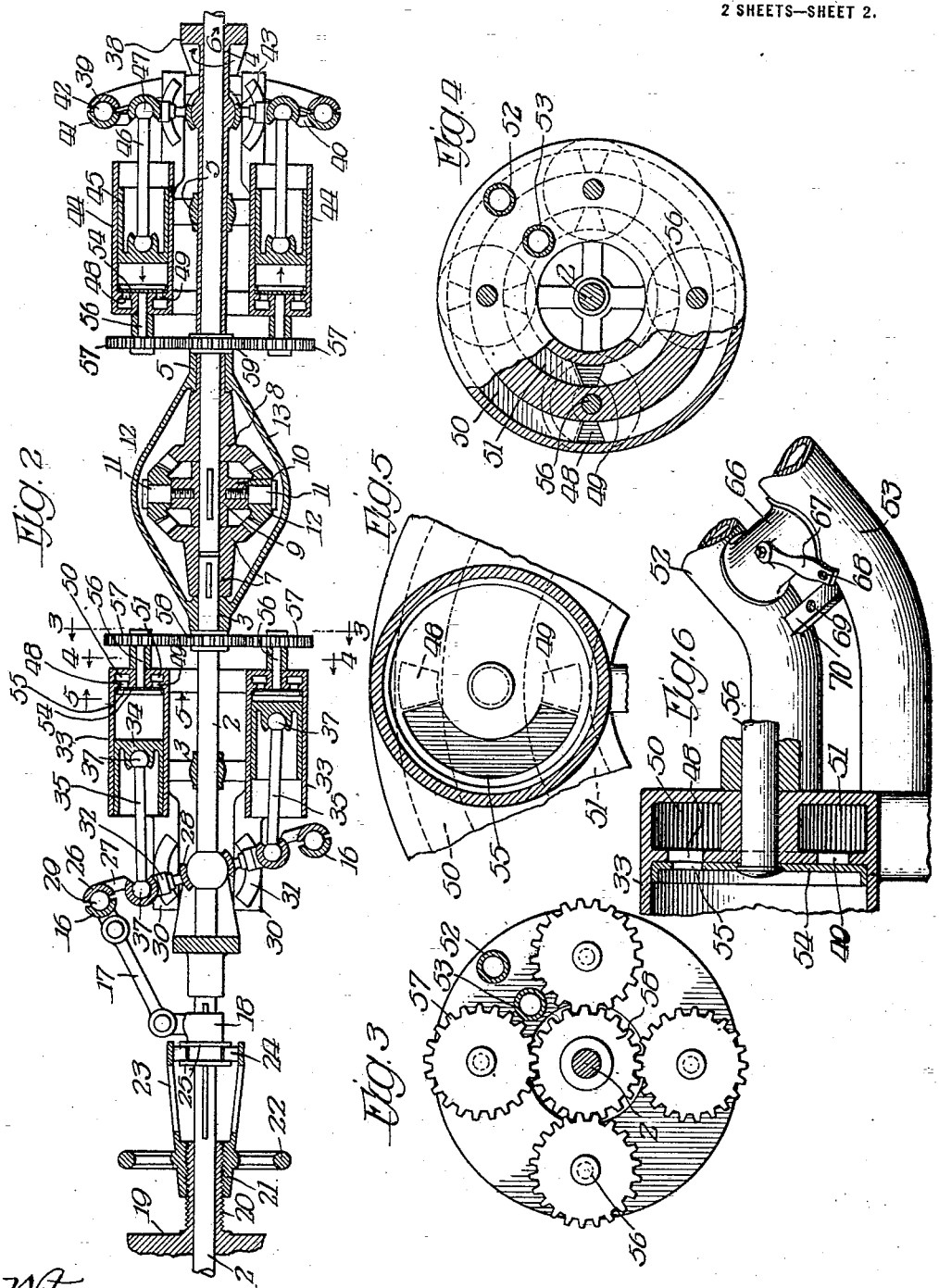

GUSTAVE BLUEMEL, OF CHICAGO, ILLINOIS, ASSIGNOR OF ONE-HALF TO WILLIAM M. SIMPSON, OF CHICAGO, ILLINOIS.

TRANSMISSION MECHANISM.

1,197,789.      Specification of Letters Patent.     Patented Sept. 12, 1916.

Application filed March 24, 1915. Serial No. 16,537.

*To all whom it may concern:*

Be it known that I, GUSTAVE BLUEMEL, a subject of the Emperor of Austria-Hungary, residing at Chicago, in the county of Cook and State of Illinois, have invented certain new and useful Improvements in Transmission Mechanism, of which the following is a specification.

This invention relates in general to power transmission and more specifically to a variable speed transmission mechanism adapted to be driven by any prime-mover, whereby all speeds from zero to maximum are obtainable without the necessity of shifting gears.

The usual type of variable speed transmission mechanism involves the use of numerous gears, speed variations being obtainable by shifting the gears to provide different gear ratios. These gear ratios are fixed and hence the number of speeds is limited by the number of respective gear sets, which is necessarily small to prevent undue bulk of the mechanism. Transmission mechanisms of this type are subject to numerous other defects, among which are excessive wear of the parts and liability to breakage unless skilfully used.

It is an object of my invention to provide a variable speed transmission mechanism which overcomes the inherent defects of mechanism requiring gear ratio changes.

Another object of my invention is to provide a variable speed transmission mechanism, whereby the speed may be readily varied between zero and maximum by a simple operation and with a minimum of effort and skill.

Still another object of my invention is the provision of a variable speed transmission mechanism which may be constructed of a minimum number of relatively simple and inexpensive parts and which is compact and free from liability to disarrangement when carelessly operated.

Other objects and advantages of my invention will be apparent as it is better understood by reference to the following specification when read in connection with the accompanying drawings in which—

Figure 1 is a vertical section through the device which is an illustrative embodiment of my invention; Fig. 2 is a section of the device shown in Fig. 1 on a plane normal to the plane of Fig. 1; Fig. 3 is a section on the line 3—3 of Fig. 2; Fig. 4 is a section on the line 4—4 of Fig. 2; Fig. 5 is a section on the line 5—5 of Fig. 2; Fig. 6 is an enlarged detail in section of the valve mechanism of the cylinders; Fig. 7 is a section on the line 7—7 of Fig. 1; Fig. 8 is an enlarged detail in section of the pressure release valves, and Fig. 9 is a detail in section of the guides for the thrust spiders.

Referring to the drawings, 1 indicates a base, which may be of any suitable form, to support the mechanism. A driving shaft 2, adapted to be driven from any type of prime-mover, is mounted in suitable bearings 3 supported from the base 1 and a hollow shaft 4, adapted to be driven from the shaft 2 in a manner presently to be described is similarly mounted in the bearings 5. A driven shaft 6 is mounted within the hollow shaft 4 and is adapted to deliver the power transmitted to the mechanism to be driven.

A bevel gear 7 is splined to the shaft 2 and a similar bevel gear 8 secured in any suitable manner to the hollow shaft 4. In the present embodiment the gear 8 is shown as integral with the hollow shaft 4, but it is to be understood that this disclosure is illustrative merely. Splined to the shaft 6 is a member 9 having a plurality of arms 10 to which the bearing members 11 are secured. Bevel gears 12 are mounted on the bearing members 11 and engage with the bevel gears 7 and 8, the whole constituting a planetary system which is inclosed by a housing 13.

Splined to the shaft 2 is a yoke 14 which supports the trunnions 15 of the annular ball-race 16. The ball-race 16 is adapted to be moved about its axis on the trunnions 15 by means of a link 17 secured thereto and to a collar 18 splined to the shaft 2 and movable longitudinally thereof. The collar 16 may be moved by any suitable mechanism which in the present instance comprises a fixed member 19, having a threaded sleeve 20 surrounding the shaft 2 and engaged by a threaded collar 21, movable by a hand wheel 22 and connected to the collar 18 by the arms 23 carrying lugs 24, which slidably engage the collar 18 between the flanges 25. An annular ball-race 26 is mounted on a spider 27 which is in turn supported by the shaft 2 by means of a universal connection 28. The ball-race 26 operatively engages the ball-race 16 through the balls 29 disposed therebetween. The spider 27 is prevented from rotating with the shaft 2 by the guides 30 rigidly supported in any suitable manner and having bearing faces 31 disposed on either side of the rollers 32 carried by the arms of the spider 27, as is clearly shown in Fig. 9. Supported in any suitable manner upon the base 1, adjacent the spider 27, are a plurality of cylinders 33 in which the plungers 34 are disposed, the plungers being connected to the spider 27 by plunger rods 35 having universal connections 37 at either end with the plungers 34 and the spider 27, respectively.

Secured in any suitable manner to the hollow shaft 4, and in this instance shown integral therewith, is a yoke 38 carrying a ball-race 39, similar to the ball race 16. It will be noted that the ball race 39 is, however, fixed with respect to the yoke 38. A spider 40 carrying a ball-race 41, adapted to coöperate with the ball-race 39 through the balls 42, is supported through a universal connection 43 on the hollow shaft 4. A plurality of cylinders 44, similar to the cylinders 33, are suitably mounted on the frame 1 and the plungers 45 are disposed therein and connected to the spider 40 by means of the plunger rods 46 having universal connections 47 at either end with the plungers 45 and the spider 40, respectively.

At one end of each of the cylinders 33 and 44, and adapted to be connected with the interior of each of the cylinders through the ports 48 and 49 are the annular ducts 50 and 51. The ducts 50 and 51 of the opposing sets of cylinders 33 and 44 are, respectively, connected by the conduits 52 and 53, whereby fluids may circulate between the respective sets of cylinders. The ports 48 and 49 are controlled by rotary valves 54, each having an elongated slot 55 therein which, as the valves rotate, coöperate with one of the ports 48 or 49 to connect the interiors of the cylinders with one of the ducts 50 or 51. The rotary valves 54 are mounted on valve stems 56 carrying pinions 57 which are adapted to be driven by the gears 58 and 59 secured to the shaft 2 and the hollow shaft 4, respectively.

The operation of my device will, it is thought, be readily understood without further description of the structure thereof.

The cylinders 33 and 44 are adapted to contain a noncompressible fluid, preferably oil. The shaft 2 being driven at any speed by means of a suitable prime-mover, the bevel gear 7 and the yoke 14 will be rotated at the same speed. The yoke 38 maintains the ball-race 39 in a plane, the angle of which with respect to the axis of the hollow shaft 4 is constant. If the ball-race 16 is set by means of the hand wheel 22 at the same angle (see Fig. 2) the plungers 34 will be caused to reciprocate within the cylinders 33 as the ball race 16 rotates with the shaft 2.

The valves 54 in the cylinder 33 are rotated through the gear 58 and pinions 57 at the same speed as the shaft 2 and the valves 54 are timed to open one of the ports, preferably 48, as the plunger 34 in each of the cylinders 33 begins its forward movement, the port 49 being at the same time closed. As the plunger 34 moves forwardly, the fluid is forced from the cylinder into the annular duct 50 and thence through the conduit 52 to the corresponding duct 50 of the cylinders 44. The valves 54 in the cylinders 44 are operated through the gear 59 and pinion 57 at the same speed as the hollow shaft 4 and are so timed that the port 48 therein will be opened as the plunger 45 is about to begin its rearward stroke, the port 49 being at the same time closed. It is obvious that inasmuch as the cylinders 33 and 44 are arranged in circular relation about a central axis certain of the plungers 34 and 45 will be moving inwardly while other plungers in each set will be moving outwardly, hence fluid will be constantly circulated between the opposed sets of cylinders 33 and 44.

The fluid forced from the cylinder 33 will cause the plunger 45 in the cylinder 44 to move rearwardly and this force acting through plunger rod 46, spider 40 and ball-race 41 will cause a sidewise thrust on the ball-race 39, whereby the yoke 38 and the hollow shaft 4 is caused to rotate, carrying with it the bevel gear 8. Since the angle at which the ball-races 16 and 39 are disposed with respect to the axis of the shaft 2 and the hollow shaft 4 is in this instance the same, the strokes of the plungers 34 and 45 will be identical and the speed of rotation of the hollow shaft 4 will be equal to the speed of rotation of the shaft 2 but in the opposite direction. It will be seen, therefore, that the bevel gears 12 will rotate merely about their bearings 11 and the shaft 6 will remain idle. If, however, the ball-race 16 is set by means of the hand wheel 22 in a plane normal to the axis of the shaft 2 (Fig. 1) there will be no movement of the plungers 34 as the shaft 2 rotates. There will, therefore, be no circulation of fluid in the system, hence the yoke 38, the shaft 4 and consequently the bevel gear 8 will be idle. The rotation of the shaft 2 will consequently, through the bevel gears 12, cause the shaft 6 to rotate at the highest speed obtainable, which would with this construction be half the speed of the shaft 2.

Having described the two extremes in the operation of my device it is obvious that by disposing the ball-race 16 in various planes having different angular relations with respect to the axis of the shaft 2 the stroke of the plungers 34 will be varied at will. Since the stroke of the plungers 45 is fixed it will require a quantity of fluid greater than that delivered by the movement of one of the plungers 34 to cause each of the plungers 45 in the cylinders 44 to make a full rearward stroke. Consequently the speed of rotation of the hollow shaft 4 will be correspondingly slower than the speed of rotation of the shaft 2. The speed of the shaft 6 under these conditions will be half the differential of the speeds of the shaft 2 and the hollow shaft 4.

By disposing the ball-race 16 in a plane at a greater angle to a plane normal to the axis of the shaft 2 than that indicated in Fig. 2, it will be obvious that the stroke of the plungers 34 may be made greater than the stroke of the plungers 45 and hence for reasons similar to those pointed out in the preceding description the hollow shaft 4 will be caused to rotate at a greater speed than the speed of rotation of the shaft 2. It follows that the shaft 6 will be rotated in a reverse direction. It is also obvious that any speed may be obtained in reverse from zero to maximum within the range of the particular mechanism employed.

To prevent disarrangement through shocks, where an attempt is made to start the mechanism under too great a load or at too high a speed, I provide the pressure relief device 60 disposed between the conduits 52 and 53. This pressure relief device comprises a pair of ducts 61 and 62, connecting conduits 52 and 53 and the valves 63 and 64 disposed, respectively, in the ducts 61 and 62 and normally held in closed position by springs 65. The springs 65 are adjusted to allow the valves to open whenever the pressure in either of the conduits 52 or 53 becomes abnormal so that the fluid may by-pass from one to the other of the conduits. This effectively prevents accidental destruction of the mechanism.

In order that the mechanism may be made inoperative I provide another duct 66 between the conduits 52 and 53 and dispose therein a suitable relief cock (not shown), which is operable by means of a suitable handle 67 and which may be locked with the cock in open position in any suitable manner, such as by the use of a padlock disposed through openings 68 and 69 in the handle 67 and a fixed bar 70, respectively. When the cock is disposed in open position the fluid is allowed to by-pass between the conduits 52 and 53 and hence the pump mechanism is inoperative.

It will be seen from the foregoing that I have succeeded in perfecting a transmission mechanism of simple character which provides for variation of speed between zero and maximum both in the forward and reverse directions and without the necessity of constantly shifting gears. The gears in my mechanism are constantly in mesh and hence the danger of stripping gears while changing speeds is obviated. Moreover, the excessive wear of the parts due to constant shocks is eliminated and these advantages together with the great flexibility of my device indicate that it provides a practically perfect transmission mechanism.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a device of the character described, the combination of a plurality of driving shafts adapted to be actuated from a single source or power, a driven shaft actuated thereby, and fluid-pressure means disposed in power-transmitting relation between said driving shafts for controlling the relative speeds thereof, whereby the speed of said driven shaft may be varied.

2. In a device of the character described, the combination of a plurality of driving shafts, means for actuating one of said driving shafts from the other, a driven shaft actuated by said driving shafts, said means including fluid-pressure means disposed in power-transmitting relation between said driving shafts for controlling the relative speeds thereof, whereby the speed of said driven shaft may be varied.

3. In a device of the character described, the combination of a plurality of driving shafts, fluid-pressure means for actuating one of said driving shafts from the other, a driven shaft actuated by said driving shafts, and means for controlling said fluid-pressure means to vary the relative speeds of said driving shafts, whereby the speed of said driven shaft may be varied.

4. In a device of the character described, the combination of a plurality of driving shafts, fluid-pressure means for actuating one of said driving shafts, a driven shaft actuated by said driving shafts, and means for controlling said fluid-pressure means to vary the relative speeds of said driving shafts, whereby the speed of said driven shaft may be varied.

5. In a device of the character described, the combination of two driving shafts, a driven shaft adapted to be actuated thereby, and fluid pressure means disposed in power transmitting relation between said driving shafts for controlling the relative speeds thereof, whereby the speed of said driven shaft may be varied.

6. In a device of the character described, the combination of two driving shafts adapted to be actuated from a single source of power, fluid pressure means disposed between one of said driving shafts and the source of power, a driven shaft adapted to be actuated by said driving shafts, and means for controlling said fluid-pressure means to vary the relative speeds of said driving shafts, whereby the speed of said driven shaft may be varied.

7. In a device of the character described, the combination of a plurality of driving elements, means for transmitting power to one of said driving elements, comprising opposed sets of fluid pressure cylinders, valve-controlled connecting conduits therebetween, plungers in said cylinders, and power transmitting connections to the plungers in one of said sets of cylinders and from the plungers in the other of said sets of cylinders to said driving element, a driven element adapted to be actuated by said driving elements, and means for varying the stroke of said plungers in one of said sets of cylinders to vary the relative speeds of said driving elements, whereby the speed of said driven element may be varied.

8. In a device of the character described, the combination of a plurality of driving elements, means for transmitting power from one to the other of said driving elements, comprising opposed sets of fluid pressure cylinders, valve-controlled connecting conduits therebetween, plungers in said cylinders, and power transmitting connections between said driving elements and said plungers, a driven element adapted to be actuated by said driving elements, and means for varying the stroke of said plungers in one of said sets of cylinders to control the relative speed of said driving elements, whereby the speed of said driven element may be varied.

9. In a device of the character described, the combination of a plurality of driving elements, means for transmitting power to one of said driving elements, comprising opposed sets of fluid pressure cylinders, each provided with inlet and outlet ports, valves for controlling said ports, connecting conduits between said sets of cylinders, plungers in said cylinders, and power transmitting connections to the plungers in one of said sets of cylinders and from the plungers in the other of said sets of cylinders to said driving element, a driven element adapted to be actuated by said driving elements, and means for varying the stroke of the plungers in one of said sets of said cylinders to vary the relative speeds of said driving elements, whereby the speed of said driven element may be varied.

10. In a device of the character described, the combination of a plurality of driving elements, means for transmitting power to one of said driving elements, comprising opposed sets of fluid pressure cylinders, each provided with inlet and outlet ports, valves for controlling said ports, means for actuating the valves in the opposed sets of cylinders in synchronism with the respective driving elements, connecting conduits between said sets of cylinders, plungers in said cylinders, and power transmitting connections to the plungers in one of said sets of cylinders and from the plungers in the other of said sets of cylinders to said driving element, a driven element adapted to be actuated by said driving elements, and means for varying the stroke of the plungers in one of said sets of said cylinders to vary the relative speeds of said driving elements, whereby the speed of said driven element may be varied.

11. In a device of the character described, the combination of a plurality of driving elements, means for transmitting power to one of said driving elements, comprising opposed sets of fluid pressure cylinders, each provided with inlet and outlet ports, valves for controlling said ports, means for actuating the valves in the opposed sets of cylinders in synchronism with the respective driving elements, connecting conduits between said sets of cylinders, plungers in said cylinders, and power transmitting connections to the plungers in one of said sets of cylinders and from the plungers in the other of said sets of cylinders to said driving element, a driven element adapted to be actuated by said driving elements, means for varying the stroke of the plungers in one of said sets of said cylinders to vary the relative speeds of said driving elements, whereby the speed of said driven element may be varied, and a pressure releasing by-pass between said conduits.

12. In a device of the character described, the combination of a plurality of driving elements, means for transmitting power to one of said driving elements, comprising opposed sets of fluid pressure cylinders, each provided with inlet and outlet ports, valves for controlling said ports, means for actuating the valves in the opposed sets of cylinders in synchronism with the respective driving elements, connecting conduits between said sets of cylinders, plungers in said cylinders, and power transmitting connections to the plungers in one of said sets of cylinders and from the plungers in the other of said sets of cylinders to said driving element, a driven element adapted to be actuated by said driving elements, means for varying the stroke of the plungers in one of said sets of said cylinders to vary the relative speeds of said driving elements, whereby the speed of said driven element may be varied, and a manually operable by-pass between said conduits.

13. In a device of the character described, the combination of a plurality of driving elements, means for transmitting power from one to the other of said driving elements, comprising opposed sets of fluid pressure cylinders, each provided with outlet and inlet ports, valves for controlling said ports, connecting conduits between said sets of cylinders, plungers in said cylinders, and power transmitting connections between said driving elements and said plungers, a driven element adapted to be actuated by said driving elements, and means for varying the stroke of said plungers in one of said sets of cylinders to control the relative speed of said driving elements, whereby the speed of said driven element may be varied.

14. In a device of the character described, the combination of a plurality of driving elements, means for transmitting power from one to the other of said driving elements, comprising opposed sets of fluid pressure cylinders, each provided with outlet and inlet ports, valves for controlling said ports, means for actuating the valves of the opposed sets of cylinders in synchronism with the respective driving elements, connecting conduits between said sets of cylinders, plungers in said cylinders, and power transmitting connections between said driving elements and said plungers, a driven element adapted to be actuated by said driving elements, and means for varying the stroke of said plungers in one of said sets of cylinders to control the relative speed of said driving elements, whereby the speed of said driven element may be varied.

15. In a device of the character described, the combination of a plurality of driving elements, means for transmitting power from one to the other of said driving elements, comprising opposed sets of fluid pressure cylinders, each provided with outlet and inlet ports, valves for controlling said ports, means for actuating the valves of the opposed sets of cylinders in synchronism with the respective driving elements, connecting conduits between said sets of cylinders, plungers in said cylinders, and power transmitting connections between said driving elements and said plungers, a driven element adapted to be actuated by said driving elements, means for varying the stroke of said plungers in one of said sets of cylinders to control the relative speed of said driving elements, whereby the speed of said driven element may be varied, and a pressure releasing by-pass between said conduits.

16. In a device of the character described, the combination of a plurality of driving elements, means for transmitting power from one to the other of said driving elements, comprising opposed sets of fluid pressure cylinders, each provided with outlet and inlet ports, valves for controlling said ports, means for actuating the valves of the opposed sets of cylinders in synchronism with the respective driving elements, connecting conduits between said sets of cylinders, plungers in said cylinders, and power transmitting connections between said driving elements and said plungers, a driven element adapted to be actuated by said driving elements, means for varying the stroke of said plungers in one of said sets of cylinders to control the relative speed of said driving elements, whereby the speed of said driven element may be varied, and a manually operable by-pass between said conduits.

17. In a device of the character described, the combination of two rotatable driving shafts, means for transmitting power from one to the other of said shafts, comprising opposed sets of fluid pressure cylinders, each provided with outlet and inlet ports, valves for controlling said ports, means for actuating the valves of the opposed sets of cylinders in synchronism with the respective shafts, connecting conduits between said sets of cylinders, plungers in said cylinders, a member, connected to the plungers in one set of said cylinders, rotatable with one of said shafts and movable into planes having different angular relations with the axis of said shaft, a member, connected to the plungers in the other of said sets of cylinders, rotatable with the other of said shafts and disposed in a plane bearing a fixed angular relation to said shaft, a driven shaft having a differential driving connection with said driving shafts, and means for varying the angular relation of said first-mentioned member to control the relative speed of said driving shafts, whereby the speed of said driven shaft may be varied.

18. In a device of the character described, the combination of two rotatable driving shafts, means for transmitting power from one to the other of said shafts, comprising opposed sets of fluid pressure cylinders, each provided with outlet and inlet ports, valves for controlling said ports, means for actuating the valves of the opposed sets of cylinders in synchronism with the respective shafts, connecting conduits between said sets of cylinders, plungers in said cylinders, a member, connected to the plungers in one set of said cylinders, rotatable with one of said shafts and movable into planes having different angular relations with the axis of said shaft, a member, connected to the plungers in the other of said sets of cylinders, rotatable with the other of said shafts and disposed in a plane bearing a fixed angular relation to said shaft, a driven shaft having a differential driving connection with said driving shafts, means for varying the angular relation of said first-mentioned member to control the relative speed of said driving shafts, whereby the speed of said driven shaft may be varied, and a pressure releasing by-pass between said conduits.

19. In a device of the character described, the combination of two rotatable driving shafts, means for transmitting power from one to the other of said shafts, comprising opposed sets of fluid pressure cylinders, each provided with outlet and inlet ports, valves for controlling said ports, means for actuating the valves of the opposed sets of cylinders in synchronism with the respective shafts, connecting conduits between said sets of cylinders, plungers in said cylinders, a member, connected to the plungers in one set of said cylinders, rotatable with one of said shafts and movable into planes having different angular relations with the axis of said shaft, a member, connected to the plungers in the other of said sets of cylinders, rotatable with the other of said shafts and disposed in a plane bearing a fixed angular relation to said shaft, a driven shaft having a differential driving connection with said driving shafts, means for varying the angular relation of said first-mentioned member to control the relative speed of said driving shafts, whereby the speed of said driven shaft may be varied, and a manually operable by-pass between said conduits.

GUSTAVE BLUEMEL.

Witnesses:
ERNEST H. MERCHANT,
W. T. WESTERBERG.